United States Patent [19]

Momose et al.

[11] Patent Number: 5,102,239
[45] Date of Patent: Apr. 7, 1992

[54] CERAMIC BEARING

[75] Inventors: Terunobu Momose; Tetsuo Shibata, both of Mizunami, Japan

[73] Assignee: Wing Highcera Co., Ltd., Japan

[21] Appl. No.: 759,825

[22] Filed: Sep. 13, 1991

Related U.S. Application Data

[63] Continuation of Ser. No. 473,657, Feb. 1, 1990, abandoned.

[30] Foreign Application Priority Data

Feb. 2, 1989 [JP] Japan .................................. 1-22576

[51] Int. Cl.$^5$ .......................... F16C 33/04; F16C 19/55
[52] U.S. Cl. .................................. 384/276; 384/901; 384/907.1
[58] Field of Search ...................... 384/901, 907.1, 276, 384/280, 297

[56] References Cited

U.S. PATENT DOCUMENTS

| | | | |
|---|---|---|---|
| 3,056,637 | 10/1962 | Shanley et al. | 384/901 X |
| 3,279,721 | 10/1966 | Dethman | 384/901 X |
| 3,920,293 | 11/1975 | Takeuchi | 384/297 X |
| 4,427,309 | 1/1984 | Blake | 384/901 X |
| 4,664,595 | 5/1987 | Tsuji et al. | 384/297 X |

FOREIGN PATENT DOCUMENTS

| | | | |
|---|---|---|---|
| 167124 | 7/1988 | Japan | 384/907.1 |
| 107152 | 6/1917 | United Kingdom | 384/901 |

*Primary Examiner*—Thomas R. Hannon
*Attorney, Agent, or Firm*—Eckert Seamans Cherin & Mellott

[57] ABSTRACT

A ceramic bearing is provided by an outer ring, an inner ring, and a sliding ring fitted between the outer and inner rings. Each of the rings is made from ceramic material. Sliding contact occurs between the sliding ring and the inner ring, and between the sliding ring and the outer ring. Whereas the difference in relative rotation between the respective rings is divided among a plurality of relatively sliding surfaces, the bearing can support increased loads and rotation speeds.

3 Claims, 4 Drawing Sheets

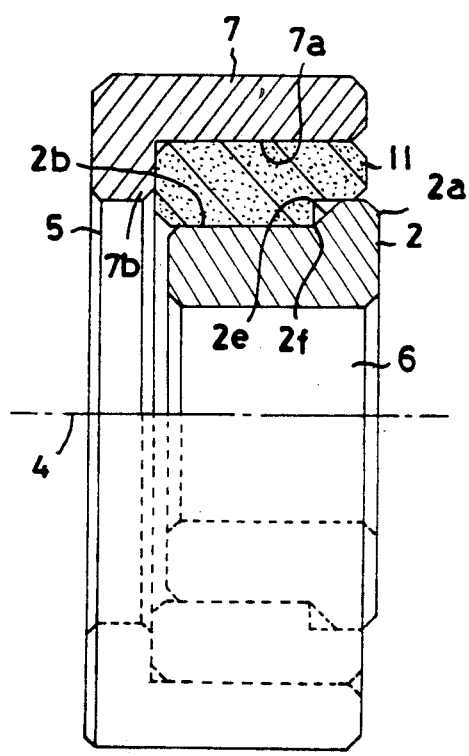
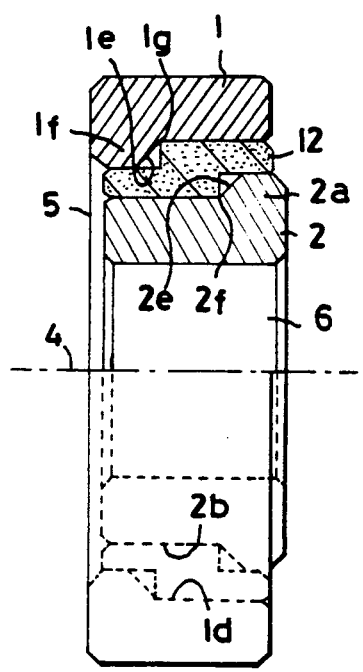

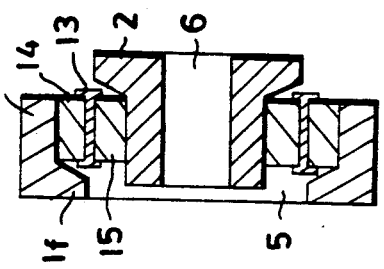
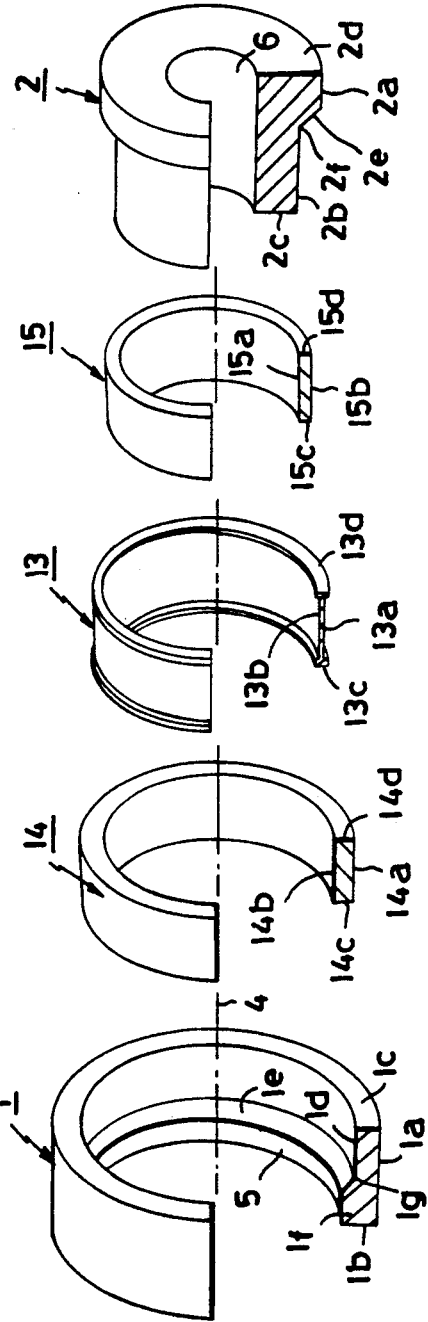
FIG.6(A)
FIG.6(B)

CERAMIC BEARING

This is a continuation of application Ser. No. 473,657, filed Feb. 1, 1990, now abandoned.

BACKGROUND OF THE INVENTION

1. Field of the Invention

The invention relates to a ceramic bearing comprising a ceramic outer ring, a ceramic inner ring, and a ceramic sliding ring which is fitted between the ceramic outer ring and the ceramic inner ring.

2. Prior Art

A bearing such as a sliding bearing or a roller bearing is commonly used for housing a rotating shaft in an assembly. The roller bearings comprise rolling members such as balls, rollers, or needles, which are positioned between an outer ring fitted into a housing provided in a mechanical frame, and an inner ring into which the rotating shaft is installed. The roller bearings are classified as ball, roller, or needle bearings according to the type of rolling member used (Japanese Patent Publication No. 49-41231).

Among the roller bearings, deep-groove type, angular ball type, and tapered-roller type bearings are used for supporting a shaft to which radial and thrust loads are applied at the same time.

Some of the sliding bearings include a steel, cast iron, or copper support upon which a white metal layer is laminated and formed to a predetermined dimension by machining. Others of the sliding bearings include a copper or gun-metal support having an oil-impregnated alloy which is laminated upon or embedded into the support.

A sliding bearing having a sleeve-shaped support is known as a bearing for supporting radial loads (Japanese Patent Publication No. 49-18885). In addition, a sliding bearing having a metal support formed in disk-shape is known for supporting thrust loads (Japanese Patent Publication No. 49-678).

The roller and sliding bearings are standardized, being commonly available and having common features. In practice, these bearings are designed and selected according to the requirements of the application for which they will be used. However, the known sliding and roller bearings are deficient in some areas.

A number of problems may arise with the known roller bearings. Flaking of rolling members due to fatigue limits service life, and worn rolling members make the bearing noisy. The roller bearings have low heat resistance. Additionally, the roller bearings are costly due to a relatively larger number of components.

The known sliding bearings exhibit a different and distinct set of problems. Sliding friction between an outside circumference of a shaft journal and an inside circumference of the bearing generates heat. The amount of heat generated depends on the load applied to the shaft and the sliding speed. The amount of heat increases as the sliding speed and/or load increases. The heat causes thermal expansion of the shaft and the bearing, and is likely to adversely affect smooth rotation of the shaft. In addition, as the shaft journal and the inside circumference of the bearing slide in close contact with each other, wear results on the shaft and the bearing, and the wear also may obstruct the smooth rotation of the shaft.

Additionally, for sliding bearings, a load per unit area which the sliding bearing can support depends on the bearing material. In conventional sliding bearings, iron or copper-based metal is the material employed; however, the allowable load per unit area for the metals is smaller than that for ceramics. Therefore, a large bearing area is needed to support a large load, and the size of the sliding bearing becomes quite large. Further, for the sliding bearings, when supporting a shaft to which thrust and radial loads are applied at the same time, a sleeve-shaped radial bearing and a disk-shaped thrust bearing must be utilized in combination, or a bearing suitable for the application must be designed each time.

SUMMARY OF THE INVENTION

It is an object of the invention to provide a sliding bearing capable of supporting a shaft which carries a large load and rotates at a high speed.

It is another object of the invention to provide a bearing having a small number of components.

It is a further object of the invention to provide a bearing utilizing a ceramic inner ring, a ceramic outer ring, and a ceramic sliding ring.

These objects are achieved by a ceramic bearing having a ceramic sliding ring which is fitted between a ceramic outer ring and a ceramic inner ring.

As above described, the ceramic sliding ring (to be called the "sliding ring") is positioned between the ceramic outer (to be called the "outer ring") and the ceramic inner ring (to be called the "inner ring"). Thereby, a load which is applied to a shaft installed in the inner ring is transmitted from the inner ring, through the sliding ring, to the outer ring, and is thus supported. Since each ring is formed of ceramic material, the compressive strength of each ring is higher than it would be if formed of iron or copper-based metal, and the allowable load of the ceramic bearing is larger than that of the conventional sliding ring bearing.

In addition, a sliding surface is formed between an outside circumference of the inner ring and an inside circumference of the sliding ring, and another sliding surface is formed between an outside circumference of the sliding ring and an inside circumference of the otter ring. When the inner ring rotates at the same rotating speed as a shaft fitted into the inner ring, the sliding ring rotates at a rotating speed lower than that of the inner ring, thereby lagging behind the inner ring in rotating speed. Thus, the full difference between the rotating speeds of the inner ring and the outer ring can be shared as smaller differences between the sliding surfaces. The relative sliding speed at each sliding surface is lower than the sliding speed between an outer ring and inner ring when arranged to rotate in direct sliding contact with each other, and heat and wear produced on each sliding surface is reduced. When the bearing is designed, the sliding speed on each sliding surface is a design specification, and the bearing can support a shaft rotating at a higher speed than the conventional sliding bearings will permit. Moreover, no sliding takes place between the inner ring, which is fixed to the shaft journal, and the shaft. Thus, the shaft never wears down.

Additionally, the bearing according to the invention may comprise a plurality of sliding rings fitted between the outer and inner rings, and sliding surfaces corresponding to the number of fitted sliding rings. Thus it is possible to lower the sliding speed and to reduce heat and wear on each of the sliding surfaces.

BRIEF DESCRIPTION OF THE DRAWINGS

FIG. 4 is a cross sectional view illustrating the bearing of a fourth embodiment of the invention.

FIG. 5 is a cross-sectional view illustrating the bearing of a fifth embodiment of the invention.

FIG. 6(A) is a cross-sectional view illustrating the bearing of the sixth embodiment of the invention.

FIG. 6(B) is an exploded perspective view illustrating components of the bearing of the sixth embodiment.

DETAILED DESCRIPTION OF THE PREFERRED EMBODIMENTS

Figure 1B:
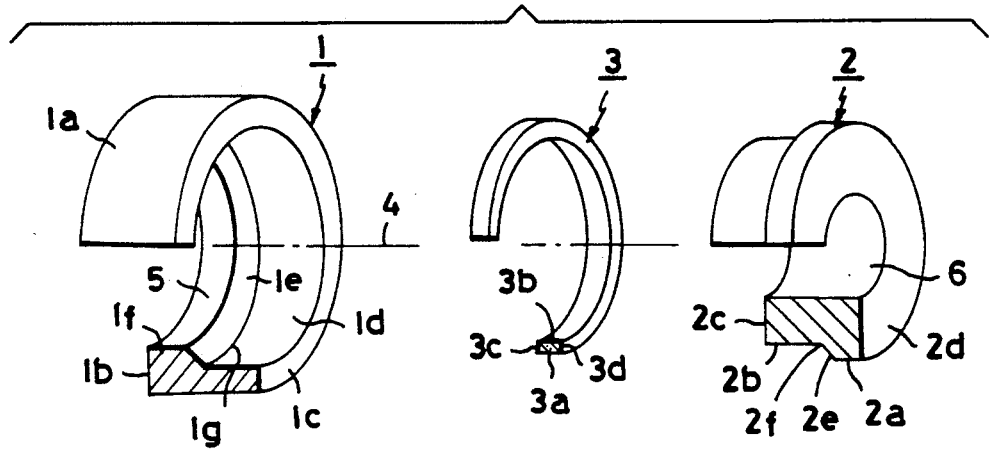
FIG. 1(B) is an exploded perspective view illustrating components of the bearing of the first embodiment.
Figure 1A:
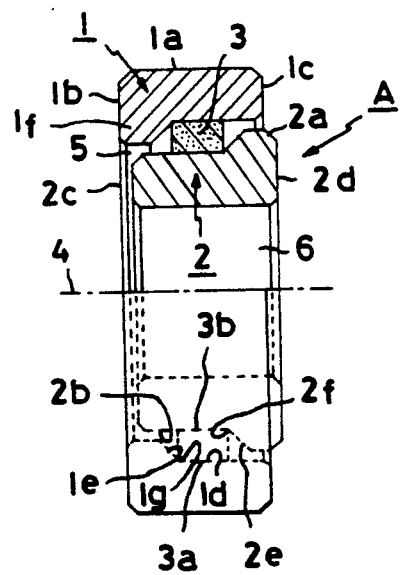
FIG. 1(A) is a sectional view illustrating the bearing of a first embodiment of the present invention.

As shown in FIGS. 1(A) and (B), a bearing according to the invention comprises an outer ring 1, an inner ring 2, and a sliding ring 3 which is fitted between the outer ring 1 and the inner ring 2.

The outer ring 1 is produced through a process using an oxide ceramic material based on Partially-Stabilized-Zirconia (to be called "PSZ" hereinafter) or alumina, which is charged into a mold and is press-formed, and the molded compact ring is sintered at 1500° C. to 1600° C.

The outer ring is formed with a cylindrical outside circumference portion 1a and end faces 1b and 1c. The outside circumference portion 1a is dimensioned for installation in a housing which is provided in a machine. For a precise fit, the outside circumference portion 1a is made parallel to an axial center 4 of the outer ring 1, to a predetermined diameter and close tolerance. The end face 1b has a through bore 5. The inside circumference of the outer ring 1 defines a sliding surface 1d which has a predetermined length in the axial direction from the end face 1c. The sliding surface 1d has a cylindrical-shape and is parallel to the axial center 4. A tapered surface 1e is formed between the sliding surface 1d and the through bore 5, and the outer ring 1 incorporates a circumferential protrusion 1f on the inside circumference at the side of end face 1b.

The inner ring 2 is produced through a process using an oxide ceramic material of PSZ or alumina which is charged into a mold and press-formed, and the molded compact ring is sintered at 1500° C. to 1600° C.

The inner ring 2 is formed with a flange-shaped, circumferential protrusion 2a, a cylindrical sliding surface 2b, and end faces 2c and 2d. A tapered surface 2e is formed between the sliding surface 2b and the flange-shaped, circumferential protrusion 2a.

The inner ring 2 has a bore 6 which is coaxial with the axial center 4, and a shaft (not shown) is fitted into the bore 6. The shaft-fitting bore 6 is formed with a predetermined diameter held to a close tolerance, for fixedly receiving a shaft to which a radial load, a thrust load, or the resultant load of said loads is applied. When the thrust load is applied to the shaft fixed in the shaft-fitting bore 6, the end face 2d also is provided as a face to which the thrust load is transmitted, in contact with an end face of the shaft.

The sliding ring 3 is produced through a process using an oxide ceramic material of PSZ or alumina which is charged into a mold and press-formed, and the molded compact ring is sintered at 1500° C. to 1600° C.

The sliding ring 3 is sleeve-shaped, and the outside circumference of the sliding ring 3 defines a sliding surface 3a in sliding contact with the sliding surface 1d formed on the inside circumference of the outer ring 1. The sliding surface 3a holds a predetermined tolerance relative to the sliding surface 1d of the outer ring 1. The inside circumference of the sliding ring 3 also defines a sliding surface 3b in sliding contact with the sliding surface 2b on the outside circumference of the inner ring 2, and the sliding surface 3b holds a predetermined tolerance relative to the sliding surface 2b on the inner ring 2.

The sliding ring 3 defines an end face 3c which abuts tapered surface 1e, or neck portion 1g of said tapered surface 1e, on the inside circumference of the outer ring 1. The sliding ring 3 also defines an end face 3d which may abut a tapered surface 2e, or a neck portion 2f of said tapered surface 2e, on the outside circumference of the inner ring 2.

In a bearing constructed as described above, a journal portion (not shown) of the shaft is fixed in the shaft-fitting bore 6 in the inner ring 2, and a radial load applied to the shaft is transmitted from the inner ring 2, through the sliding ring 3, to the outer ring 1. When a thrust load is applied to the shaft, a stepped diameter portion of the shaft abuts the end face 2d of the inner ring 2, and thereby the thrust load is transmitted from the inner ring 2, through the sliding ring 3, to the outer ring 1.

For example, when only a radial load is applied to a shaft which is fixed in the shaft-fitting bore 6, rotating the shaft causes the inner ring to rotate at the same speed as the shaft. Thus, the load is transmitted from the sliding surface 2b on the outside circumference of the inner ring 2 to the sliding surface 3b on the inside circumference of the sliding ring 3, and at the same time, the sliding surfaces 2b and 3b are in sliding contact. A driving force, which depends upon a friction coefficient between said sliding surfaces 2b and 3b, the radial load, and the rotating speed of the inner ring 2, is transmitted to the sliding ring 3, and causes the sliding ring 3 to rotate. Sliding contact occurs between the sliding surface 3a on the outside circumference of the sliding ring 3 and the sliding surface 1d on the inside circumference of the outer ring 1.

Assuming that the outer ring 1, the inner ring 2, and the sliding ring 3 are made from the same material, and that factors which affect friction coefficients of the sliding surfaces 2b, 3b and 3a, such as surface roughness, are the same, then sliding speeds, i.e., the difference between rotating speeds, for each pair of sliding surfaces will be approximately the same and in each case will be smaller than if the inner and outer rings were in direct sliding contact with each other.

As another example, when only a thrust load is applied to the shaft which is fixed in the shaft-fitting bore 6, the inner ring 2 rotates at the same speed as the shaft. The thrust load is transmitted from the neck portion 2f of the tapered surface 2e on the outside circumference of said inner ring 2, to the end face 3d of the sliding ring 3. Sliding contact occurs between the neck portion 2f and the end face 3d.

As described, when a shaft is supported by the bearing, radial and thrust loads on the shaft are transmitted from the inner ring 2, through the sliding ring 3, to the outer ring 1. Thus it is possible to increase sliding surface area by fitting the sliding ring 3 between the inner ring 2 and the outer ring 1. Further, the rotation of the inner ring 2 relative to the outer ring 1 may be shared by a plurality of sliding rings. Accordingly, a high-speed rotating shaft can be supported by providing an increased sliding surface area, that is, a high-speed rotating shaft can be supported with the ceramic bearing of the invention.

Figure 2:
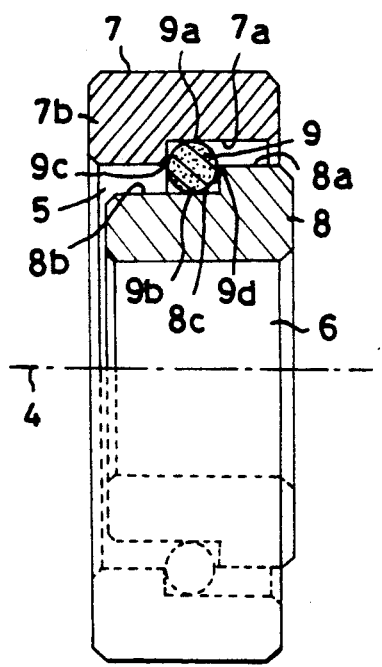
FIG. 2 is a cross-sectional view illustrating the bearing of a second embodiment of the invention.

FIG. 2 is a cross-sectional view of a bearing according to a second embodiment of the invention, wherein a sliding ring 9 having a circular cross-section is fitted between an outer ring 7 and an inner ring 8. Throughout the drawings, like features are numbered identically, and a further description of these like features is not necessary. The outer ring 7, the inner ring 8, and the sliding ring 9 are press-formed from an oxide ceramic material based on PSZ or alumina, and are sintered at 1500° C. to 1600° C.

The inside circumference of the outer ring 7 defines a through bore 5 and a sliding surface 7a which is parallel to an axial center 4. Said sliding surface 7a has a diameter larger than that of the through bore 5. A circumferential protrusion 7b is defined between the through bore 5 and the sliding surface 7a. The height of said protrusion 7b is slightly larger than one-half of the thickness of the sliding ring 9, that is, slightly larger than a radius of the sliding ring 9.

An outside circumference of the inner ring 8 defines a flange-shaped protrusion 8a and a sliding surface 8b. A riser portion 8c between the flange-shaped protrusion 8a and the sliding surface 8b has a height which is slightly greater than one-half of the thickness of the sliding ring 9, that is, slightly greater than the radius of the sliding ring 9.

The sliding ring 9 has a circular cross-section of predetermined radius, and sliding portions 9a, 9b, 9c and 9d refer to an outside circumferential portion, an inside circumferential portion and each end face, respectively.

In said bearing comprising the outer ring 7, the inner ring 8, and the sliding ring 9, the sliding portion 9a on the outside circumference of the sliding ring 9 is in contact with the sliding surface 7a on the inside circumference of the outer ring 7. Likewise, the sliding portion 9b is in contact with the sliding surface 8b on the outside circumference of the inner ring 8; the sliding portion 9c is in contact with a riser portion of the protrusion 7b on the inside circumference of the outer ring 7; and the sliding portion 9d is in contact with the riser portion 8c on the outside circumference of the inner ring 8. Thus, four sliding surfaces are formed. Thereby, the bearing is constructed so that it is capable of supporting radial and thrust loads applied to a shaft (not shown) fixed to the inner ring 8. In this embodiment, since the cross-section of the sliding ring 9 is circular and relatively small, the bearing can be relatively compact.

Figure 3:
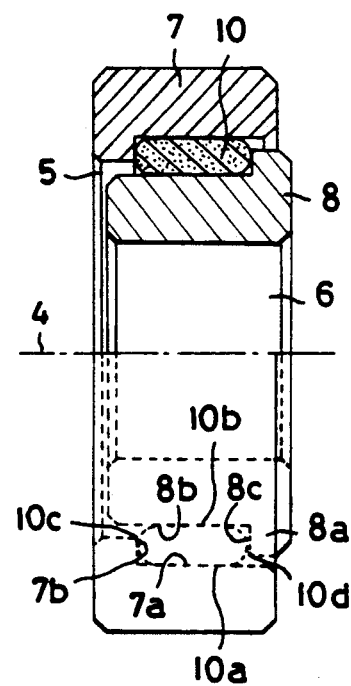
FIG. 3 is a cross-sectional view illustrating the bearing of a third embodiment of the invention.

FIG. 3 is a cross-sectional view of a bearing according to a third embodiment of the invention, wherein a sliding ring 10 having an elliptic cross-section is fitted between an outer ring 7 and an inner ring 8.

An outside circumferential surface of the sliding ring 10 defines a sliding surface 10a which is in contact with a sliding surface 7a defined by an inside circumferential surface of the outer ring 7. An inside circumferential surface of the sliding ring 10 defines a sliding surface 10b which is in contact with a sliding surface 8b defined by an outside circumferential surface of the inner ring 8. When viewed in cross-section, the sliding ring 10 has round-shaped ends. One of the ends defines a sliding surface 10c which is in contact with a riser portion of the protrusion 7b of the outer ring 7, and another of the ends defines a sliding surface 10d which is in contact with a riser portion 8c of the inner ring 8. Similar to the first and second embodiments described above, the bearing of this embodiment can support radial and thrust loads which are applied to a shaft (not shown) fixed to the inner ring 8. Since the cross-section of the sliding ring 10 is elliptical in shape, the sliding ring 10 has a relatively large radial loading area.

FIG. 4 is a cross sectional view of a bearing according to a fourth embodiment of the invention, wherein a sliding ring having an L-shaped cross-section is fitted between the outer ring 7 of the embodiment shown in FIG. 2, and the inner ring 2 of the embodiment shown in FIG. 1.

The bearing of this embodiment is capable of employing the whole sliding surface 2b, defined by the outside circumference of the inner ring 2 and the outside circumference of the flange-shaped protrusion 2a, as a loaded area, and thus can support a large radial load.

FIG. 5 is a cross-sectional view of a bearing according to a fifth embodiment of the invention, wherein a sliding ring 12 having a Z-shaped cross-section is fitted between the outer ring 1 and the inner ring 2 of the embodiment shown in FIG. 1.

The bearing of this embodiment, like the bearing shown in FIG. 4, can employ the whole of sliding surface 2b, defined by the outside circumference of the inner ring 2 and the outside circumferential surface of the flange-shaped protrusion 2a, as a loaded area. Thereby, the bearing of this embodiment can support a large load.

FIGS. 6(A) and (B) illustrate a bearing according to a sixth embodiment of the invention, wherein a plurality of sliding rings are fitted between the outer ring 1 and inner ring 2. Referring to the drawings, the outer ring 1 and inner ring 2 are similar to those shown in the embodiment of FIG. 1. Sliding rings 14 and 15 are held by a retainer 13 and are fitted between the outer ring 1 and the inner ring 2. The sliding rings 14 and 15 and the retainer 13 are made from the same material in the same manner as the sliding ring 3 shown in FIG. 1.

The sliding ring 14 is sleeve-shaped, and an outside circumferential surface defines a sliding surface 14a which is in sliding contact with sliding surface 1d defined by the inside circumference of the outer ring 1. Another end face of the sliding ring 14 defines sliding surface 14d which is in sliding contact with a flange 13d of the retainer 13, and the sliding ring 14 is rotatably slidable on the sliding surface 13a of the retainer 13.

The sliding ring 15 is sleeve-shaped, and an inside circumferential surface defines a sliding surface 15a which is in sliding contact with a sliding surface 2b defined by the outside circumference of the inner ring 2. An outside circumferential surface of the sliding ring 15 defines a sliding surface 15b which is in sliding contact with an inside circumferential surface 13b of the retainer 13. One end face of the sliding ring 15 defines a sliding face 15c which is in sliding contact with a flange 13c of the retainer 13. Another end face defines a sliding face 15d which is in sliding contact with a neck portion 2f of a tapered surface 2e defined by the outside circumference of the inner ring 2, and the sliding ring 15 is rotatably slidable on the surface 13b of the retainer 13.

The retainer 13 can be formed by melt-bonding flange portions 13c and 13d on both ends of a sleeve-shaped ring, or by melt-bonding a flange on one end of T-shaped ring.

In the bearing of the sixth embodiment above described, four sliding surfaces are defined by the sliding rings 14, 15 and the retainer 13, and the outer and inner rings 1 and 2. Accordingly, the rotating speed of the shaft fixed to the inner ring 2 is divided among the four sliding surfaces, and thus a sliding speed on each sliding surface can be decreased, thereby reducing heat and wear caused by friction on each sliding surface. Additionally, when the sliding speed on each sliding surface is allowed to approach a predetermined maximum, the bearing can support a shaft rotating at a higher speed than the prior art bearings would allow.

In each of the above described embodiments, each sliding surface of the outer ring, the inner ring and the sliding ring can be additionally finish treated by lapping, if necessary. The lapping may be done separately on each of the outer, inner, and sliding rings, or may be selectively done by rubbing the rings together with abrasive such as diamond powder applied to the surfaces between the rings. Lapping each sliding surface permits the bearing to rotate more smoothly.

In addition, in each of the above described embodiments, the outer, inner, and sliding rings slide on the sliding surface in contact with each other, and heat is naturally generated by sliding friction. However, since each of the rings is made from ceramic material, heat affects the bearing less than it would if the bearing was made of metal. Since a coefficient of thermal expansion of ceramic is 3 to $11 \times 10^{-6}/°C.$, excessive stress will not be produced by thermal expansion, and thermal deterioration will not occur.

What is claimed is:

1. A ceramic bearing having a central axis, comprising:
    a ceramic outer ring defining a cylindrical inner sliding surface, a tapered sliding surface extending axially and radially inwardly from the inner sliding surface;
    a coaxial ceramic inner ring defining a cylindrical outer sliding surface, a tapered sliding surface extending axially and radially outwardly from the outer sliding surface; and,
    a coaxial ceramic sliding ring disposed between the ceramic inner ring and the ceramic outer ring, the ceramic sliding ring defining a cylindrical inner sliding surface in sliding contact with the cylindrical outer sliding surface of the ceramic inner ring, a cylindrical outer sliding surface in sliding contact with the cylindrical inner sliding surface of the ceramic outer ring, a first end face extending radially outwardly from the cylindrical inner sliding surface, wherein a junction of the first end face and the cylindrical inner sliding surface defines a first circumferential edge in sliding line contact with the tapered sliding surface of the ceramic inner ring, and a second end face extending radially inwardly from the cylindrical outer sliding surface, wherein a junction of the second end face and the cylindrical outer sliding surface defines a second circumferential edge in sliding line contact with the tapered sliding surface of the ceramic outer ring.

2. A ceramic bearing having a central axis, comprising:
    a ceramic outer ring defining a cylindrical inner sliding surface, a riser sliding surface extending radially inwardly from the inner sliding surface;
    a coaxial ceramic inner ring defining a cylindrical outer sliding surface, a riser sliding surface extending radially outwardly from the outer sliding surface; and,
    a coaxial ceramic sliding ring disposed between the ceramic inner ring and the ceramic outer ring, the ceramic sliding ring defining a cylindrical inner sliding surface in sliding contact with the cylindrical outer sliding surface of the ceramic inner ring, a cylindrical outer sliding surface in sliding contact with the cylindrical inner sliding surface of the ceramic outer ring, a first end face extending in a semicircle between the cylindrical inner sliding surface and the cylindrical outer sliding surface, the first end face being in sliding line contact with the riser sliding surface of the ceramic inner ring, and a second end face extending in a semicircle between the cylindrical inner ring and the cylindrical outer ring, the second end face being in sliding line contact with the riser sliding surface of the ceramic outer ring.

3. A ceramic bearing having a central axis, comprising:
    a ceramic outer ring defining a cylindrical inner sliding surface, a riser sliding surface extending radially inwardly from the inner sliding surface;
    a coaxial ceramic inner ring defining a cylindrical outer sliding surface, a riser sliding surface extending radially outwardly from the outer sliding surface; and,
    a coaxial ceramic sliding ring disposed between the ceramic inner ring and the ceramic outer ring, the ceramic sliding ring having a circular cross-section and defining an inner sliding surface in sliding line contact with the cylindrical outer sliding surface of the ceramic inner ring, an outer sliding surface in sliding line contact with the cylindrical inner sliding surface of the ceramic outer ring, a first end sliding surface in sliding line contact with the riser sliding surface of the ceramic inner ring, and a second end sliding surface in sliding line contact with the riser sliding surface of the ceramic outer ring.

* * * * *